United States Patent [19]

Linzey et al.

[11] Patent Number: 5,019,418
[45] Date of Patent: May 28, 1991

[54] METALLIZED FILM CAPACITOR PROCESS

[75] Inventors: Raynor Linzey, Adams; Herbert L. Rice, Williamstown, both of Mass.

[73] Assignee: Sprague Electric Company, North Adams, Mass.

[21] Appl. No.: 198,605

[22] Filed: May 9, 1988

Related U.S. Application Data

[62] Division of Ser. No. 710,834, Mar. 12, 1985, abandoned.

[51] Int. Cl.$^5$ .................................................. H01G 7/00
[52] U.S. Cl. ..................................... 427/79; 29/25.42
[58] Field of Search .................... 29/25.42; 427/79–81

[56] References Cited

U.S. PATENT DOCUMENTS

| | | | |
|---|---|---|---|
| 2,740,732 | 4/1956 | Peck et al. | 361/304 |
| 2,749,490 | 6/1956 | Robinson et al. | 361/323 |
| 3,202,892 | 8/1965 | Netherwood | 361/273 |
| 3,271,642 | 9/1966 | Baldwin | 361/304 |
| 4,190,878 | 2/1980 | Förster | 361/305 |
| 4,215,385 | 7/1980 | Behn et al. | 361/273 |
| 4,305,111 | 12/1981 | Förster | 361/273 |
| 4,449,163 | 5/1984 | Dequasie et al. | 361/315 |

*Primary Examiner*—Carl E. Hall

[57] ABSTRACT

A self-healing metallized film capacitor has a dielectric sheet metallized with a metal or alloy so chosen to provide the desired sheet resistivity for a given metallization thickness. The invention applies to any metallized film capacitor in which electrode metallization thickness and clearability are important considerations.

4 Claims, 1 Drawing Sheet

METALLIZED FILM CAPACITOR PROCESS

CROSS-REFERENCE TO RELATED APPLICATION

This application is a division of application Ser. No. 710,834, filed Mar. 12, 1985, and now abandoned.

BACKGROUND OF THE INVENTION

This invention relates to a process for a self-healing metallized film capacitor in which the metallization material is so chosen to provide both a desired sheet resistivity and a given metallized electrode thickness. The invention relates to a process for making metallized film capacitors in which electrode thickness and clearability (self-healing characteristics) are important considerations, e.g., capacitors subjected to high electrical stress.

Prior art teaches that improved self-healing of metallized film capacitors can be obtained by decreasing the thickness of the metallized layer. However, decreasing the electrode thickness decreases the quality of end connection, increases the edge field, increases the difficulty in controlling electrode thickness and, in the case of an AC capacitor, increases the rate of electrode loss due to corrosion.

It has been proposed to use an aluminum-copper alloy metallization to reduce capacitance loss in metallized film capacitors. However, with this alloy, it was felt necessary to reduce metallization thickness to improve the self-healing characteristics.

Aluminum-copper alloy metallization in normal thicknesses has been used in self-healing capacitors but at a high copper content.

SUMMARY OF THE INVENTION

It is an object of this invention to provide a process for making a self-healing metallized film capacitor in which the electrode thickness and sheet resistivities are chosen independently of each other. This is accomplished through the use of a high resistivity alloy, preferably an aluminum alloy, as metallization material.

For a given capacitor application, the metallization thickness is determined from the properties needed for this application including the thickness necessary for good-quality, reliable end connections. Next, the desired sheet resistivity is determined from the electrical stress to which the capacitor will be subjected in the particular application. Then, the metallization alloy is selected based on its resistivity so as to provide the desired sheet resistivity and self-healing characteristics (clearability) at the specified electrode thickness.

As a first approximation the alloy is selected by determining the bulk or total resistivity needed by multiplying the desired electrode thickness (in centimeters) by the desired sheet resistivity in ohms/sq. After a trial metallization, the sheet resistivity measurements indicate what adjustments must be made, e.g., more or less alloying metal or a different alloy. As experience is gained with a particular alloying metal or groups of alloys, it is possible to select the particular alloy with greater certainty from the first approximation results.

Metallized capacitors of the present invention find use in a variety of applications such as DC capacitors, energy storage capacitors and AC capacitors. When the self-healing alloy metallized film capacitor is to be used for AC application, it is necessary to incorporate into the capacitor a material which will prevent capacitance loss and prolong AC life. This is contrary to prior art disclosures which teach that the use of alloy metallization alone will reduce or prevent capacitance loss.

The preferred materials for AC use are urethanes containing unreacted isocyanate groups as taught by Andrew Dequasie in U.S. Pat. No. 4,317,158 and U.S. Pat. No. 4,317,159, both issued Feb. 23, 1982, and by Andrew Dequasie and Herbert Rice in to the same assignee as the present invention. The material may be used alone as a liquid or potting compound or incorporated into the dielectric field.

DESCRIPTION OF THE PREFERRED EMBODIMENTS

Figure 1:
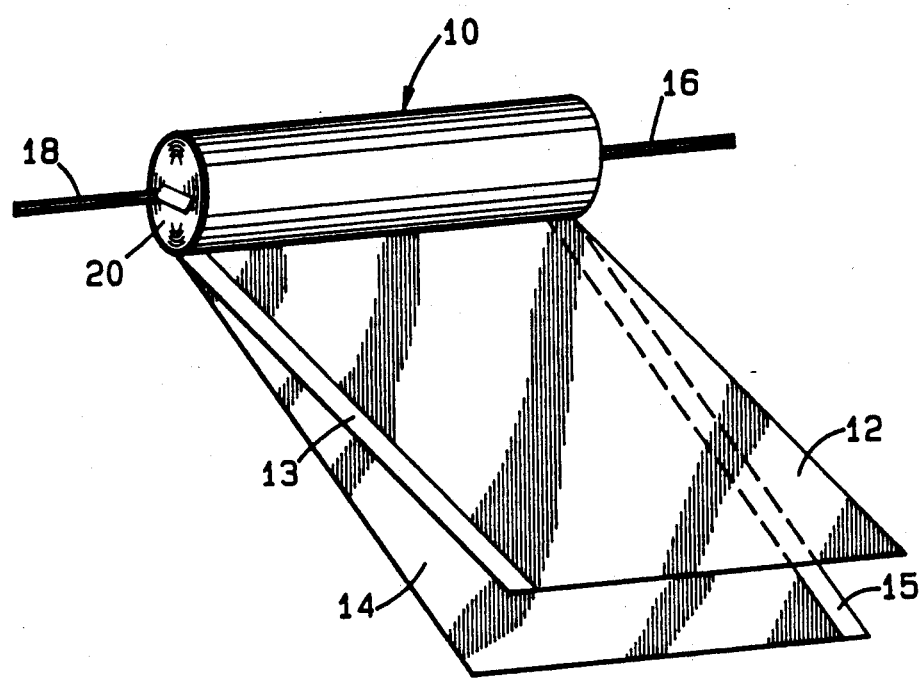
FIG. 1 depicts a partly unwound capacitor section using the alloy metallization.

A metallized film capacitor 10, such as is shown partly unrolled in FIG. 1, consists of two metallized film electrodes 12 and 14 in which the metallization is a high resistivity alloy. The electrodes 12 and 14 are provided with unmetallized margins 13 and 15, respectively, which are oppositely positioned in the wound section 10 so that the metallized portion of each electrode is available for terminal lead contact at only one edge of the winding. The ends of the wound section 10 are covered with metallic spray or solder 20, and leads or tabs 16 and 18 are connected thereby to electrodes 12 and 14, respectively.

Figure 2:
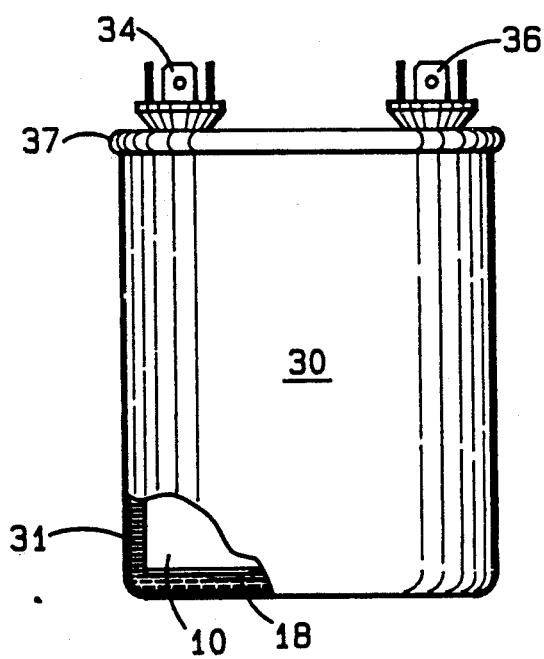
FIG. 2 depicts a capacitor with a fluid urethane additive.
Figure 3:
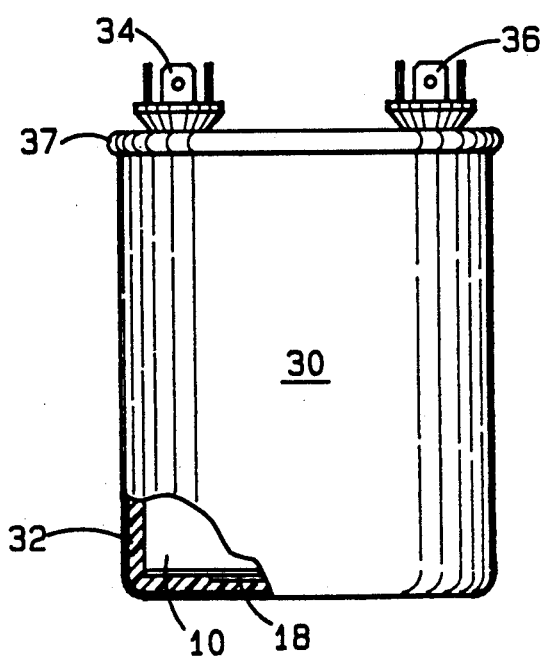
FIG. 3 depicts a capacitor in which the urethane is used as a potting compound.

FIGS. 2 and 3 show an AC capacitor in which section 10 is located in housing 30. Electrode tab 16 (not shown) and tab 18 are connected to terminals 34 and 36, respectively, located in cover 37. In FIG. 2, the urethane containing unreacted isocyanate groups is present in fluid form 31 by itself or dissolved in a dielectric fluid while in FIG. 3 the urethane is used as a potting compound 32.

The specific urethanes are those taught by Dequasie as noted above and incorporated by reference herein. The preferred urethane is a diphenyl methane diisocyanate having 33.4% unreacted isocyanate groups. It is used to improve capacitance loss of an AC capacitor during its operating life.

It is well known that thinner, and consequently higher resistance, electrode metallization provides better self-healing characteristics in high stress AC film capacitors. It was not known whether this improved self-healing or clearability is a function of electrode metal thickness or of the increased resistivity of the electrode.

It now has been determined that the dominant factor in self-healing is the sheet resistivity of the electrode rather than the thickness of the electrode. Since it is well known that the addition of a second metal (creating an alloy) normally will result in a resistivity which is greater than that of the base metal, it is possible by proper choice of metals, to tailor a system in which both the electrode sheet resistance and thickness are selected independently. This result has applications not only for DC application but others also, e.g. energy storage, AC, etc. Clearly, as one skilled in the art would realize, the alloy system must be chosen so that it does not result in any deleterious affect on the performance of the capacitor.

The base metal may be any metal which is useful in capacitors such as aluminum or zinc and is preferably aluminum. Suitable aluminum alloys are those containing chromium, copper, iron, lithium, magnesium, manganese, nickel silicon, titanium, vanadium, zinc, and zirconium. Their bulk resistivities at one and at five and a half percent are (in micro ohm-cm) respectively: Cu 2.99, 4.54; Fe 2.84, 3.10; Li 5.96, 16.91; Mg 3.19, 5.62; Mn 5.59, 9.25; Ni 2.75, 3.02; Si 3.67, 4.67; Ti 5.33, 6.01; Va 4.58, 5.66; Zn 2.74, 3.17; and Zr 3.17, 3.37.

EXAMPLE 1

This example shows the metallization of a film dielectric, specifically polypropylene of 8 $\mu$m thickness, with aluminum and with an aluminum alloy containing 4 wt% copper in three nominal sheet resistivities, 4, 6 and 8 ohn/sq. The sheet resistivity is measured on a square piece, and the result obtained is independent of the size of the square, hence ohm/sq. Since the chosen alloy has a resistivity of about twice that of aluminum, some metallized films were obtained having different resistivities at the same metallization thickness and some with different thicknesses.

In Table 1a, data are presented to show the resistivity and metal thickness of the metallized films used to prepare the test capacitors. Each result is an average of two lots metallized to the 4, 6 and 8 ohm/sq. nominal resistivity; both nominal and measured resistivities are given in ohms/sq., and the approximate aluminum surface density is given in $\mu$g/cm$^2$ of surface area.

TABLE 1a

| Sample | Metal | Resistivity Nominal | Resistivity Measured | Density |
|---|---|---|---|---|
| 1-2 | Al—Cu | 4 | 3.45 | 7.2 |
| 3-4 | Al—Cu | 6 | 4.45 | 5.2 |
| 5-6 | Al—Cu | 8 | 9.25 | 3.3 |
| 7-8 | Al | 4 | 3.74 | 4.3 |
| 9-10 | Al | 6 | 6.50 | 3.3 |
| 11-12 | Al | 8 | 9.95 | 2.4 |

Three capacitors made from each of the above samples were pulse-tested to determine the effect of electrode thickness on end connection quality. The ratio of the number of failures to total units are given for pulses of 0.6, 0.8 and 1 ampere per inch of end connection.

TABLE 1b

| Sample | Resistivity | Density | 0.6 A/in | 0.8 A/in | 1 A/in |
|---|---|---|---|---|---|
| 1 | 3.45 | 7.7 | 0/3 | 0/3 | 0/3 |
| 2 | 3.45 | 6.8 | 0/3 | 0/3 | 0/3 |
| 3 | 4.25 | 5.5 | 1/3 | 1/3 | 1/3 |
| 4 | 4.25 | 4.6 | 0/3 | 0/3 | 0/3 |
| 5 | 9.25 | 3.2 | 1/3 | 3/3 | 3/3 |
| 6 | 9.25 | 3.4 | 2/3 | 3/3 | 3/3 |
| 7 | 3.60 | 4.2 | 0/3 | 0/3 | 0/3 |
| 8 | 3.60 | 4.4 | 0/3 | 0/3 | 0/3 |
| 9 | 5.51 | 3.1 | 0/3 | 1/3 | 3/3 |
| 10 | 5.51 | 3.5 | 0/3 | 1/3 | 2/3 |
| 11 | 8.99 | 2.2 | 1/3 | 3/3 | 3/3 |
| 12 | 8.99 | 2.6 | 1/3 | 3/3 | 3/3 |

The data show that good end connections can be made using electrode thickness greater than about 5 $\mu$g/cm$^2$ and particularly in the range of about 7-8 $\mu$g/cm$^2$. There is no indication that resistivity has any effect on end connection quality.

For a self-healing capacitor, the DC breakdown is a measure of the self-healing qualities of the system. When the DC breakdowns were plotted as a function of resistivity and of thickness, it was found that breakdown, and hence ability to self-clear, is a unique function of resistivity rather than electrode thickness (in the thickness ranges considered here).

The surface density, surface resistivity, and breakdowns in volts DC are presented below:

TABLE 1c

| | Density | Resistivity | Breakdowns |
|---|---|---|---|
| Al—Cu | 7.2 | 3.45 | 1700,1700,1800,1600,1500,1600 |
| | 5.0 | 4.25 | 2200,2300,2100,2300,2000,2200 |
| | 3.3 | 9.25 | 2700,2800,2700,2400,2400,2400 |
| Al | 4.3 | 3.6 | 1600,1700,1700,1900,1700,1800 |
| | 3.3 | 5.51 | 2500,2600,2400,2400,2600,2700 |
| | 2.4 | 8.99 | 3000,3100,3100,3100,3000,3000 |

Comparing DC breakdown for 3.45 and 3.6 ohm/sq resistivities and for both 3.3 $\mu$g/cm$^2$ densities, it can be seen that DC breakdown is determined by resistivity rather than electrode thickness.

EXAMPLE 2

This example shows the use of the alloy metallization in AC capacitor applications. As has been shown by Dequasie, noted above, the loss of capacitance of a metallized polypropylene capacitor on AC voltage due to corrosion can be controlled by the addition of unreacted isocyanate to the dielectric fluid. Normally, 8$\mu$ thick polypropylene is used for AC capacitors to be operated at 370 VAC and 10$\mu$ polypropylene for those to be operated in the 440 to 480 VAC range. Since this limitation is predominately determined by the loss of capacitance due to corrosion, it is to be expected that the addition of isocyanate to the dielectric fluid would allow 6$\mu$ polypropylene to be operated at 370 VAC and 8$\mu$ polypropylene to be operated in the 440 to 480 VAC range. However, when aluminum metallized capacitors manufactured in this manner were tested under accelerated conditions using standard industry requirements, the results showed a high and unacceptable number of failures due to poor self-healing.

Capacitors were constructed from polypropylene dielectric with electrodes made with aluminum containing from 5 to 6% copper and with a surface resistivity from 6.5 to 8 ohms/sq. Diphenyl methane diisocyanate (8g) was added to the dielectric fluid. The units were tested according to industry standards with the following results.

TABLE 2

| Cap. | Dielectric Thickness | Test Conditions | No. of Units | Test Hrs. | No. of Failures |
|---|---|---|---|---|---|
| 40 $\mu$f | 8 $\mu$ | 600 VAC/25° C. | 60 | 120 | 0 |
| 40 $\mu$f | 8 $\mu$ | 585 VAC/80° C. | 12 | 500 | 0 |
| 45 $\mu$f | 6 $\mu$ | 500 VAC/25° C. | 60 | 120 | 1 |
| 45 $\mu$f | 6 $\mu$ | 466 VAC/80° C. | 12 | 500 | 0 |

These results are well within industry requirements, are unattainable using the standard aluminum metallizing, but are attainable with the alloy metallization and show that a thinner dielectric film may be used with the alloy metallization.

Although the specific example cited here is for metallized polypropylene, it should be recognized that this invention can be used with any other dielectric suitable for use in a metallized capacitor such as polyester, polyvinylfluoride, polycarbonate, kraft, etc. It should also be recognized that the metallization in the application is not limited to DC use but it can be used anywhere a metallized dielectric is suitable, e.g., DC, AC, energy storage, etc.

The particular dielectric film thickness used will depend on the capacitor application. For example, for energy storage capacitors, the thickness may be 10 to 12μ where as for DC applications, the thickness will most likely be 6 to 8μ or less.

What is claimed is:

1. A process for making a self-healing metallized film capacitor comprising:

selecting a thickness of metallization to be applied to a film for termination of the capacitor;

selecting a sheet resistivity for said metallization for self-healing of the capacitor;

computing a bulk resistivity for said metallization from said thickness and said sheet resistivity;

selecting a material for said metallization having said computed bulk resistivity; and metallizing said film with said material.

2. The process of claim 1 wherein said material is selected from an alloy of aluminum with a minor portion of copper and having said desired bulk resistivity.

3. The process of claim 1 wherein said film is selected from the group of polypropylene, polyester, polyvinylfluoride, and polycarbonate.

4. The process of claim 1 wherein said metallization on said film is contacted within said capacitor by a urethane containing unreacted isocyanate groups.

* * * * *